March 18, 1941.  C. R. WEISS  2,235,596
CANE STRIPPING APPARATUS
Filed July 9, 1940  2 Sheets-Sheet 1
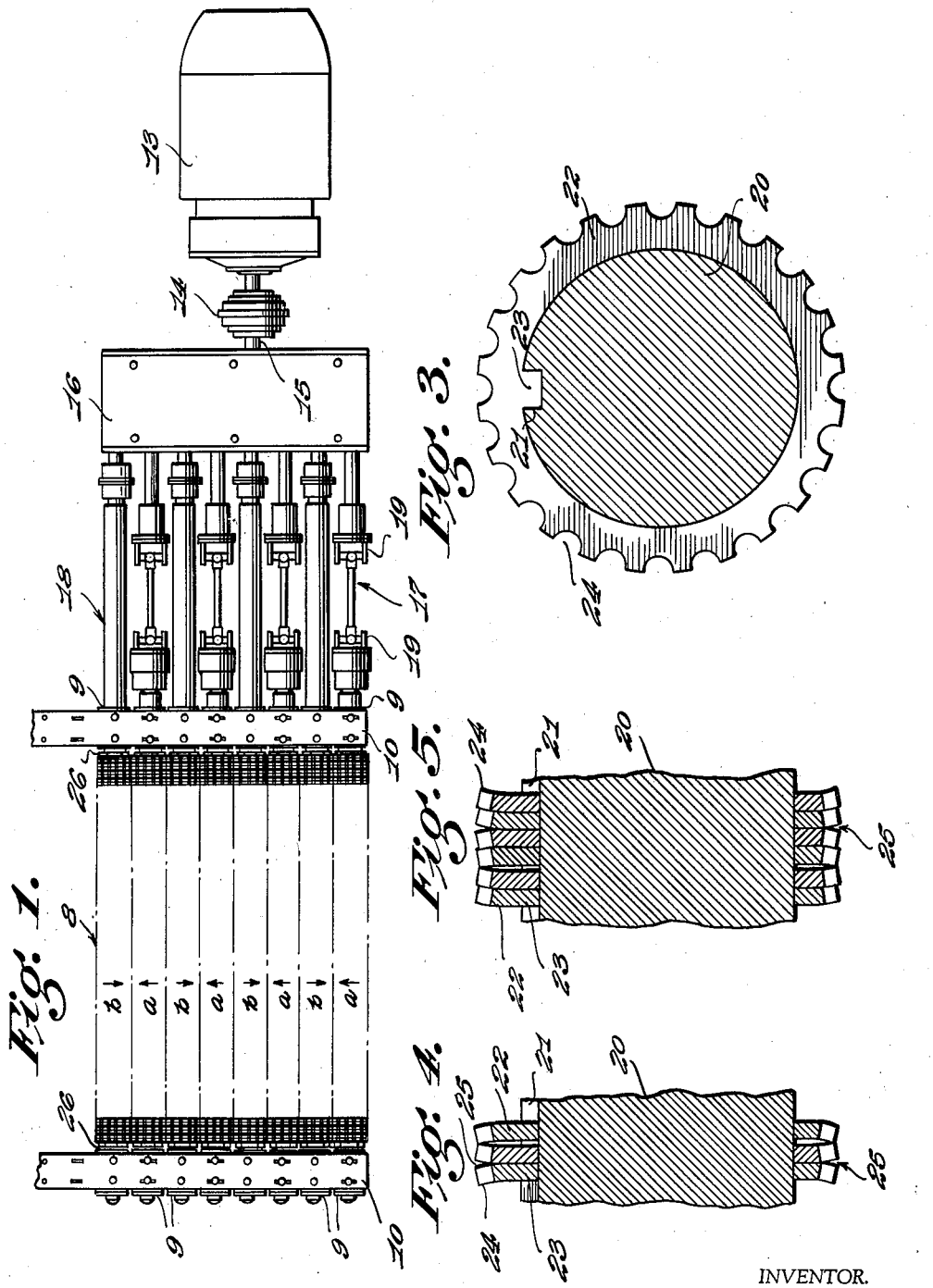
INVENTOR.
Charles R. Weiss
BY
L. Donald Myers
Attorney

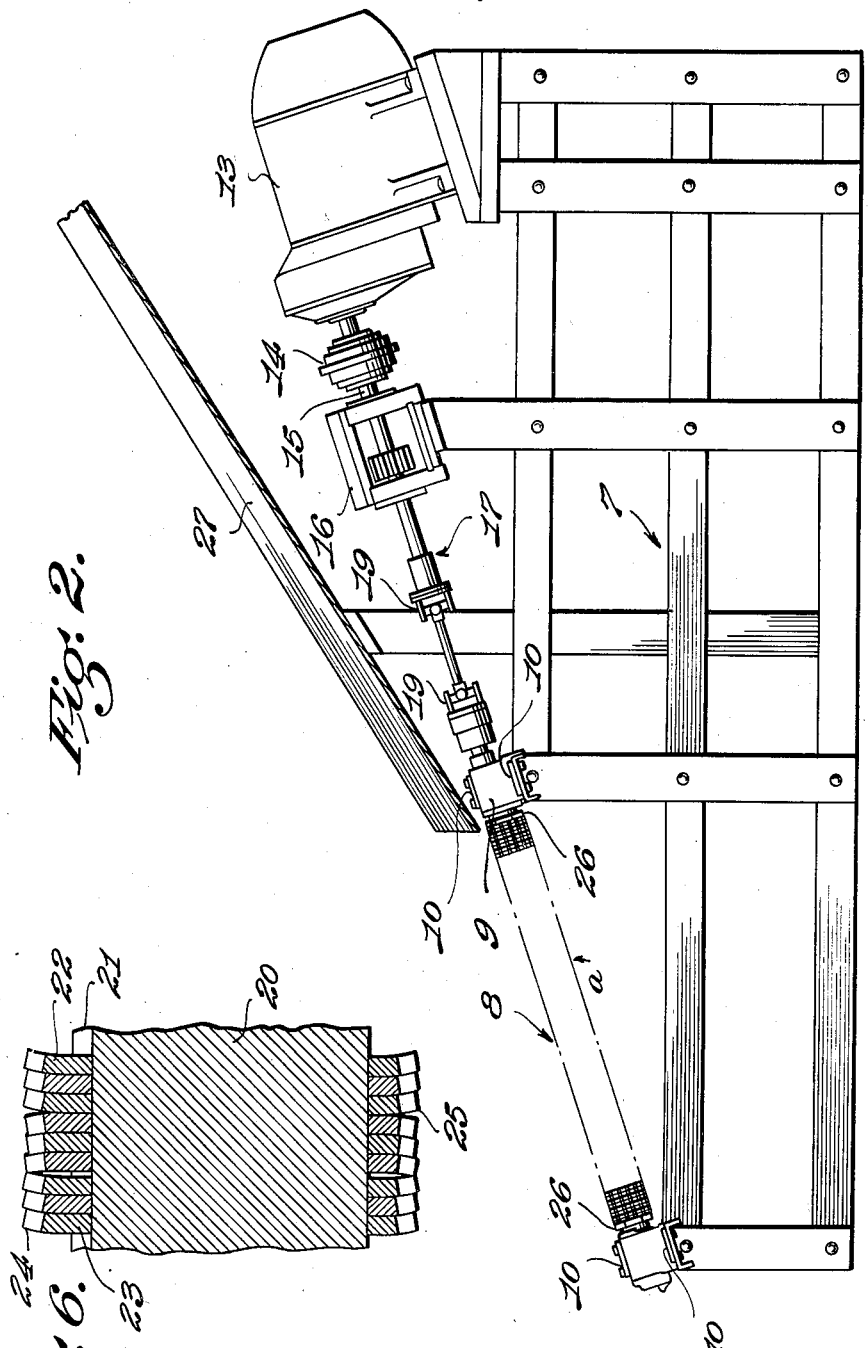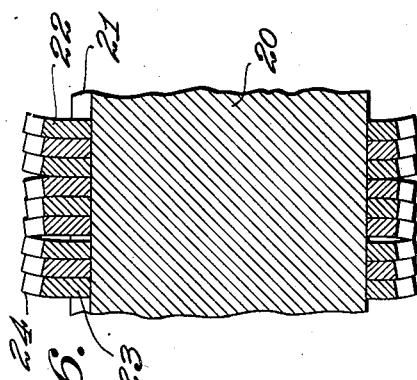

Patented Mar. 18, 1941

2,235,596

UNITED STATES PATENT OFFICE 2,235,596

CANE STRIPPING APPARATUS

Charles R. Weiss, Indianapolis, Ind., assignor to Link-Belt Company, a corporation of Illinois Application July 9, 1940, Serial No. 344,597

16 Claims. (Cl. 130—31)

This invention relates to new and useful improvements in apparatus which is particularly adapted for stripping leaves, and other trash, from sugar cane without bruising the cane sufficiently to permit any sugar content to be lost.

In order to meet the prices offered by competing sugar countries, the Hawaiian sugar industry has been compelled to abandon its former practice of relying entirely on manual labor for its cane harvesting and stripping operations. These operations have been completely mechanized.

Due to unusual climatic and topographic conditions encountered in the Islands, the cane growth is different than in any other locality. For instance, the cane does not grow straight into the air for its full length, which may be as much as 20 feet, but instead it bends over after a vertical growth of but a few feet and then extends along the ground for the intermediate part of its growth, after which it again extends vertically.

In mechanizing the harvesting and stripping operations for this peculiar growth, it has been necessary to employ unusual methods and to design special handling equipment. For example, the cane is harvested by means of power grapples, or the like, and is loaded on suitable vehicles for transportation to apparatus which separates the major portion of the foreign matter, such as dirt, vegetation, and the like, which has been picked up by the shovels with the cane. The thus cleaned cane is then conveyed to stripping apparatus where the leaves and the remaining trash is removed without bruising the cane. As a part of the stripping operation, the cane is subjected to a water rinse to wash away the sand and other gritty material still adhering thereto.

The development of a suitable stripping apparatus presented particularly troublesome problems. It was necessary for the apparatus to operate in the presence of the rinse water and the sand and gritty material suspended therein. Smooth surfaced rubber rolls, arranged in pairs with the rolls of each pair rotating in opposite directions and at a high speed, were first tried, but these rubber rolls lasted but a very few hours before they became so badly worn that they were unfit for further service. Smooth surfaced metal rolls were then tried, but they very rapidly obtained such a high polish that they would not operate to grip the trash for stripping it from the cane. It was finally determined that toothed metal rolls would have to be employed.

As a complete stripping unit or device includes in the neighborhood of 48 rolls, each of which is at least four feet long and is approximately 4 inches in outside diameter, it was necessary to develop a structure which could be economically manufactured. The machining of each one of these rolls from a single piece of stock was so costly as to be prohibitive. The roll structure embodying this invention was finally developed as a solution for this manufacturing problem.

Although the stripping apparatus embodying this invention was created especially for handling Hawaiian sugar cane, it is to be understood that the apparatus works equally as well with cane grown in other localities and with other products from which leaves and other trash must be stripped, and constitutes a marked improvement over all purely mechanical stripping devices heretofore employed.

It is the primary object of this invention to provide stripping apparatus which is exceedingly efficient in its operation and which may be manufactured at a reasonably low cost.

A further important object of this invention is the provision of a special form of roll structure which is particularly adapted for use in stripping trash from sugar cane, or the like.

Other objects and advantages of the invention will be apparent during the course of the following description.

In the accompanying drawings forming a part of this specification and in which like numerals are employed to designate like parts throughout the same, Figure 1 is a top plan view of a part of a complete stripping apparatus embodying this invention, Figure 2 is a side elevational view of the portion of the apparatus illustrated in Fig. 1, Figure 3 is a detail vertical sectional view which illustrates the construction of one of the stripping rolls incorporated in the apparatus of Figs. 1 and 2, Figure 4 is a detail, vertical, sectional view taken lengthwise through the preferred form of stripping roll embodying this invention, Figure 5 is a view similar to Fig. 4 but illustrates a slight modification regarding the arrangement of toothed stripping discs on the shaft of a stripping roll, and Figure 6 is a view similar to Fig. 4 but illustrates another modification of the arrangement of the stripping discs.

In the drawings, wherein for the purpose of illustration are shown the preferred embodiments of this invention, and particularly referring to Figs. 1 and 2, the reference character 7 designates in its entirety a suitable base or frame which is employed for supporting the main stripping apparatus. It is to be understood that this frame or base may take any desired form and the structure which has been illustrated is merely given as an example.

The most essential portion of this stripping device consists of a bank of rolls 8. These rolls are all arranged in a common, inclined plane, the inclination of which is suitable to effect feeding of the cane lengthwise of the rolls as the cane is subjected to their stripping action. Although any desired number of rolls may be provided for a complete stripping device, or machine, the most recent practice consists of six sets of rolls with eight rolls constituting a set. Fig. 1 merely illustrates one set of eight rolls. It is to be understood, however, that sufficient additional rolls to form a complete machine will be included in an operating structure.

The shafts of the respective rolls are journaled at the opposite end portions of their stripping areas in individual bearing blocks 9. To retain all of the rolls in proper assembled relation, two supports 10 are provided for each of the opposite ends of the stripping rolls. Fig. 2 clearly illustrates these supports as being arranged above and below an aligned group of bearing blocks 9.

The stripping rolls are to be operated as pairs, and the respective rolls of the pairs are designated in Fig. 1 by means of the reference characters a and b. The rolls a and b of each pair are intended to rotate in opposite directions and at high speeds. The directions of rotation are illustrated by means of the arrow lines in Fig. 1. It will be noted that these stripping rolls are rotated so that they will grip the leaves, and other trash, from the cane as it is passed downwardly over the top of the bank of rolls and will pass the stripped trash downwardly between the rolls into the space below the bank. As the peripheries of the rolls will be subjected to wear, it is essential that the rolls a and b of each pair be adjustable to maintain the proper amount of clearance between their adjacent sides.

One driving motor 13 is provided for each set of rolls of the bank 8. The shaft of this motor is connected through a suitable coupling 14 to the shaft 15 which extends into the transmission casing 16. No attempt will be made to illustrate the mechanism housed in this casing. It is to be understood, however, that suitable gear sets are provided which will convert the rotation of the shaft 15 into proper directional rotation for the drive connections 17 and 18 of the several rolls a and b. Due to the adjustability of the rolls a, universal joints 19 must be provided for the drive connections 17.

Coming now to the construction of the stripping rolls a and b, the preferred form is illustrated in Fig. 4. Modifications of this preferred form are disclosed in Figs. 5 and 6. Fig. 3 may be considered as a transverse sectional view through each one of the roll structures disclosed in Figs. 4 to 6, inclusive.

Each roll, regardless of its disc assembly, includes a central shaft 20 which is formed with a longitudinally extending keyway 21. Assembled on the central shaft is a suitable number of discs 22 which are of identical construction for all assemblies. These discs are provided with the lugs 23 which are received within the keyway 21 of the shaft 20 for retaining the discs against rotation relative to the shaft. Each disc is shaped to provide a peripheral set of teeth 24. The lugs 23, preferably although not necessarily, are so positioned relative to the teeth of the discs as to cause the teeth of all of the discs of a roll to be in line with each other. The teeth, therefore, collectively will form a parallel ribbed periphery for the roll.

These toothed discs 22 are blanked from sheets of steel and are heat treated to provide hardened stripping teeth. It will be noted by inspecting Figs. 4 to 6, inclusive, that the discs are dished or concavo-convex in transverse section.

In Figs. 4 to 6, inclusive, the dished discs are assembled with their teeth 24 at an angle with respect to the longitudinal axis of the shaft 20. This angular arrangement of the teeth has been found to be important because it improves the gripping action of the discs. Additionally, the dished formation of the discs is employed to provide spaces between some of the teeth of adjacent discs. This spacing is desirable because it enables the discs to more readily be freed of the sand and gritty materials which might otherwise accumulate in the groove formed between their teeth. In other words, it has been found that when the discs are flat and assembled with flat faces in contact with each other, solid ribs and grooves are formed by the teeth of the assembled discs. It has been determined that by providing spaces between some of the teeth of certain discs, the ribs and grooves will not be continuous throughout the length of a roll. Of course, the spacing, without the angular arrangement of the teeth, may be obtained by employing separate spacers. such as washers, between desired discs. The use of the dished discs, however, dispenses with the need for several thousands of such spacers and thereby materially reduces the manufacturing costs.

Fig. 4 illustrates the preferred arrangement of the dished discs. In this arrangement, the lateral inclination of all adjacent disc teeth are arranged in the opposite direction; i. e., the concaved or like sides of adjacent discs face each other and the convexed sides of adjacent discs are similarly arranged. This provides a space or opening 25 every second disc.

In the arrangement illustrated in Fig. 5, the discs are arranged in pairs with the discs of each pair facing in the same direction. The pairs of discs are arranged like the individual discs of Fig. 4. This arrangement provides a space 25 between every other pair of discs.

Fig. 6 illustrates an arrangement where the discs are associated in opposed groups of threes thereby providing a space 25 between every other group of three discs.

After a suitable number of discs 22 is assembled on a central shaft 20, a suitable retaining nut 26, see Figs. 1 and 2, is threaded on the central shaft 20 at each end of the assembled discs. By tightening these nuts 26, the assembled discs will be clamped evenly together. Sufficient force should be applied to the discs by the opposed nuts 26 to partially compress or slightly flatten them. This slight flattening of the dished discs will prevent them from working loose and rattling.

No attempt has been made to illustrate handling apparatus of any definite character which will operate to feed the sugar cane to the stripping device and then carry off the stripped cane and the separated trash. Fig. 2 in a very general way illustrates a trough or chute 27 which might be used to deliver the cane to the bank of stripping rolls 8. This chute, also, will function to protect the motors 13 and the transmission mechanisms which drive the rolls.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. Stripping apparatus of the type described comprising a multiplicity of pairs of stripping rolls arranged in a bank, and means for rotating the individual rolls of the bank with the rolls of each pair being rotated in opposite directions, each of said rolls comprising a central shaft, a multiplicity of dished discs assembled on said shaft, and each of said discs being formed with peripheral teeth, said dished discs being assembled on each shaft with the convexed sides of certain adjacent discs being in contact with each other so as to provide spaces between their peripheral teeth.

2. Stripping apparatus of the type described comprising a multiplicity of pairs of stripping rolls arranged in a bank, and means for rotating the individual rolls of the bank with the rolls of each pair being rotated in opposite directions, each of said rolls comprising a central shaft, a multiplicity of dished discs assembled on said shaft, each of said discs being formed with peripheral teeth, said dished discs being assembled on each shaft with the convexed sides of certain adjacent discs being in contact with each other so as to provide spaces between their peripheral teeth and means for holding said discs against rotation relative to the shaft and with the teeth of all of the discs arranged in alignment axially of the shaft.

3. Stripping apparatus of the type described comprising a multiplicity of pairs of stripping rolls arranged in a bank, and means for rotating the individual rolls of the bank with the rolls of each pair being rotated in opposite directions, each of said rolls comprising a central shaft, a multiplicity of dished discs assembled on said shaft, each of said discs being formed with peripheral teeth, said dished discs being assembled on each shaft with the convexed sides of certain adjacent discs being in contact with each other so as to provide spaces between their peripheral teeth and means for forcing said discs into tight engagement with each other.

4. Stripping apparatus of the type described comprising a multiplicity of pairs of stripping rolls arranged in a bank, and means for rotating the individual rolls of the bank with the rolls of each pair being rotated in opposite directions, each of said rolls comprising a central shaft, a multiplicity of dished discs assembled on said shaft, each of said discs being formed with peripheral teeth, said dished discs being assembled on each shaft with the convexed sides of certain adjacent discs being in contact with each other so as to provide spaces between their peripheral teeth, means for holding said discs against rotation relative to the shaft and with the teeth of all of the discs arranged in alignment axially of the shaft, and means for forcing said discs into tight engagement with each other to eliminate part of the dishing from the discs.

5. Stripping apparatus of the type described comprising a multiplicity of pairs of stripping rolls arranged in a bank, means for supporting and interconnecting the rolls of the bank with the rolls of each pair being adjustable relative to each other, and means for rotating the individual rolls of the bank with the rolls of each pair being rotated in opposite directions, each of said rolls comprising a central shaft, a multiplicity of dished discs assembled on the shaft with each disc being formed with peripheral teeth, said dished discs being assembled on each shaft with the convexed sides of certain adjacent discs being in contact with each other so as to provide spaces between their peripheral teeth and means for tightly clamping said discs together to place all of the discs under slight compression.

6. In stripping apparatus of the type described, a stripping roll comprising a central shaft and a multiplicity of dished, peripherally toothed discs assembled on the shaft, all of said discs being in engagement with each other with the convexed sides of only certain adjacent discs being in contact with each other.

7. In stripping apparatus of the type described, a stripping roll comprising a central shaft and a multiplicity of dished, peripherally toothed discs assembled on the shaft, said dished discs being assembled with the convexed sides of certain adjacent discs being in contact with each other so as to provide spaces between their peripheral teeth.

8. In stripping apparatus of the type described, a stripping roll comprising a central shaft and a multiplicity of dished, peripherally toothed discs assembled on the shaft, said dished discs being assembled with the like sides of all adjacent discs in contact with each other.

9. In stripping apparatus of the type described, a stripping roll comprising a central shaft, and a multiplicity of dished, peripherally toothed discs assembled on the shaft, said dished discs being assembled in groups with the convexed sides of all of the discs of a group being nested in the concaved sides of adjacent discs and with the discs of adjacent groups facing in opposite directions.

10. In stripping apparatus of the type described, a stripping roll comprising a central shaft and a multiplicity of dished, peripherally toothed discs assembled on the shaft, said dished discs being assembled with the convexed sides of certain adjacent discs being in contact with each other so as to provide spaces between their peripheral teeth, and means for clamping the discs together with sufficient force to partially flatten out the discs, thereby placing them under compression.

11. In stripping apparatus of the type described, a stripping roll comprising a central shaft and a multiplicity of dished, peripherally toothed discs assembled on the shaft, said dished discs being assembled with the like sides of all adjacent discs in contact with each other, and means for clamping the discs together with sufficient force to partially flatten out the discs, thereby placing them under compression.

12. In stripping apparatus of the type described, a stripping roll comprising a central shaft, and a multiplicity of dished, peripherally toothed discs assembled on the shaft, said dished discs being assembled in groups with the convexed sides of all of the discs of a group being nested in the concaved sides of adjacent discs and with the discs of adjacent groups facing in opposite directions, and means for clamping the discs together with sufficient force to partially flatten out the discs, thereby placing them under compression.

13. In stripping apparatus of the type described, a stripping roll comprising a central shaft, a multiplicity of dished, peripherally toothed discs assembled on the shaft, said dished discs being assembled on each shaft with the convexed sides of certain adjacent discs being in contact with each other so as to provide spaces between their peripheral teeth and means for holding said discs against rotation relative to the shaft with the teeth of all of the discs arranged in alignment axially of the shaft.

14. In stripping apparatus of the type described, a stripping roll comprising a central shaft, a multiplicity of dished, peripherally tothed discs assembled on the shaft, said dished discs being assembled with the convexed sides of certain adjacent discs being in contact with each other so as to provide spaces between their peripheral teeth, and means for holding said discs against rotation relative to the shaft with the teeth of all of the discs arranged in alignment axially of the shaft.

15. Stripping apparatus of the type described comprising a multiplicity of pairs of stripping rolls arranged in a bank, and means for rotating the individual rolls of the bank with the rolls of each pair being rotated in opposite directions, each of said rolls comprising a central shaft, a multiplicity of dished, peripherally toothed discs assembled on said shaft, said dished discs being assembled in groups with the convexed sides of all of the discs of a group being nested in the concaved sides of adjacent discs and with the discs of adjacent groups facing in opposite directions.

16. Stripping apparatus of the type described comprising a multiplicity of pairs of stripping rolls arranged in a bank, and means for rotating the individual rolls of the bank with the rolls of each pair being rotated in opposite directions, each of said rolls comprising a central shaft, a multiplicity of dished, peripherally toothed discs assembled on the shaft, said dished discs being assembled in groups with the convexed sides of all of the discs of a group being nested in the concaved sides of adjacent discs and with the discs of adjacent groups facing in opposite directions, and means for clamping the discs together with sufficient force to partially flatten out the discs, thereby placing them under compression.

CHARLES R. WEISS.